(12) United States Patent
Kenworthy

(10) Patent No.: US 6,332,918 B1
(45) Date of Patent: *Dec. 25, 2001

(54) PHTHALOCYANINE COMPOUNDS FOR INK-JET PRINTING

(75) Inventor: Mark Kenworthy, Manchester (GB)

(73) Assignee: Avecia Limited, Manchester (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,179

(22) Filed: Feb. 16, 1999

(30) Foreign Application Priority Data

Feb. 17, 1998 (GB) .................................................. 9803232

(51) Int. Cl.$^7$ ................................ C09D 11/02; C09B 47/04
(52) U.S. Cl. ................................ 106/31.49; 106/31.78; 106/410; 106/413; 540/133; 540/134
(58) Field of Search ............................. 106/31.49, 31.78, 106/410, 413; 540/133, 134

(56) References Cited

U.S. PATENT DOCUMENTS

| | | |
|---|---|---|
| 3,413,077 | 11/1968 | Bertin et al. . |
| 4,294,580 | 10/1981 | Henk et al. . |
| 4,649,193 | 3/1987 | Meininger et al. . |
| 5,102,459 * | 4/1992 | Ritter et al. ................. 106/31.51 |
| 5,123,960 * | 6/1992 | Shirota et al. ................. 106/31.49 |
| 5,542,972 * | 8/1996 | von der Eltz et al. .......... 106/31.49 |

FOREIGN PATENT DOCUMENTS

| | | |
|---|---|---|
| 2842187 * | 4/1980 | (DE) . |
| 0418623 | 3/1991 | (EP) . |
| 0418792 * | 3/1991 | (EP) . |
| 927404 | 5/1963 | (GB) . |
| 1566921 | 5/1980 | (GB) . |
| 61087759 | 5/1986 | (JP) . |

OTHER PUBLICATIONS

Derwent abbstract of DE2842187, Apr./1980.*
Yamamura, S. and Hirasawa, Y., "Water soluble phthalocyanine compounds", Chemical Abstracts, 105:192866 (1986), no month available.
Aziende Colori Nazionali Affini, S.p.A., "Reactive triazine dyes", Chemical Abstracts, 77:76686 (1972), no month available.
Aziende Colori Nazionali Affini, S.p.A., "Dyes (triazinyl)", Chemical Abstracts, vol. 65, column 2381a (1966), no month available.

(List continued on next page.)

*Primary Examiner*—Helene Klemanski
(74) *Attorney, Agent, or Firm*—Rothwell, Figg, Ernst & Manbeck

(57) ABSTRACT

Phthalocyanine compounds of Formula (1) have utility as colorants in inks for ink-jet printing, where Formula (1) represents:

Formula (1)

$$M_kPc\begin{matrix}(SO_3H)_x\\(SO_2NH-\end{matrix}\underset{\{L-A-R^2\}_w)_y}{\overset{\{R^1\}_z}{\diagup\!\!\!\diagdown}}$$

which comprises any form of the compound: such as salt; stereoisomer, zwitterion, polymorph, complex, isotopic form, combinations thereof in the same species and mixtures thereof; where:

M represents H, metal, halometal, oxymetal and/or hydroxymetal;

k is the inverse of half of the valency of M;

Pc represents a phthalocyanine nucleus of Formula (2):

Formula (2)

L represents a linking group comprising an optionally substituted $C_{1-30}$carbyl;

A represents —O—, —S— or —NR$^3$—, where R$^3$ independently comprises H or optionally substituted $C_{1-30}$carbyl;

R$^1$ comprises at least one group independently selected from: an optional substituent and optionally substituted $C_{1-15}$carbyl;

R$^2$ comprises optionally substituted $C_{1-30}$carbyl that comprises at least one alkyl group substituted by at least one of: hydroxy, carboxy and sulpho;

z represents an integer from 0 to 4; w represents an integer from 1 to 5; and the sum of w +z is from 1 to 5; and x and y each independently represent a non-zero number; and the mean of the sum of x +y is from about 1 to about 6;

where the optional substituents comprise at least one of: carboxy, sulpho, hydroxy, amino, mercapto, cyano, nitro and halo.

15 Claims, No Drawings

OTHER PUBLICATIONS

Imperial Chemical Industries, LTD., "Phthalocyanine pigment compounds", Chemical Abstracts, vol. 63, column 16510d (1965), no month available.

Wolf, W. and Schroeter, R., "Dyes (azaporphine)", Chemical Abstracts, vol. 63, column 16509h (1965), no month available.

Long, R., et al., "Reactive dyes contg. methylolamino triazine groups", Chemical Abstracts, vol. 60, column 6959e (1964), no month available.

Heslop, R. and Waite, F., "Soluble dyes containing hydroxy alkyl groups", Chemical Abstracts, vol. 60, column 1870d (1964), no month available.

Seibert, W., et. al., "Alcohol soluble auramine dyes", Chemical Abstracts, vol. 58, column 2530a (1963), no month available.

Clark, P. and Howard, H., "Phthalocyanine aminotriazine dyes", Chemical Abstracts, vol. 58, column 2529g (1963), no month available.

Langmaier, F., et. al., "Evaluation of sulfonated novolaks as syntans", Chemical Abstracts, vol. 56, column 2537h (1962), no month available.

* cited by examiner

PHTHALOCYANINE COMPOUNDS FOR INK-JET PRINTING

This invention relates to compounds, to ink compositions comprising them and to the use of such inks in ink jet printing ("IJP"). IJP is a non-impact printing technique in which droplets of ink are ejected through a fine nozzle onto a substrate without bringing the nozzle into contact with the substrate.

There are many demanding performance requirements for colorants and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

The applicant has discovered that certain phthalocyanine compounds have particular utility as colorants for use in IJP as they may produce prints with unexpectedly good optical density, light fastness and/or water fastness.

According to the present invention there is provided at least one compound of Formula (1):

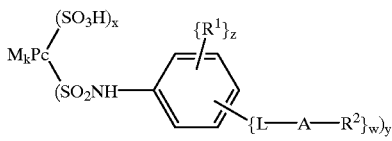

Formula (1)

which comprises any form of the compound: such as salt; stereoisomer, zwitterion, polymorph, complex, isotopic form, combinations thereof in the same species and mixtures thereof; where:

M represents H, metal, halometal, oxymetal and/or hydroxymetal;

k is the inverse of half of the valency of M;

Pc comprises a phthalocyanine nucleus of Formula (2):

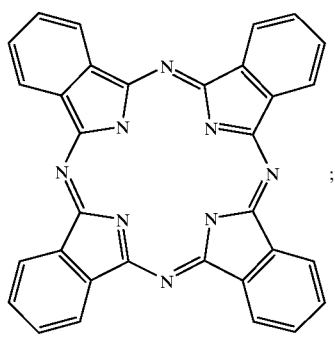

Formula (2)

L comprises a linking group comprising an optionally substituted $C_{1-30}$carbyl;

A comprises —O—, —S— or —NR$^3$—, where R$^3$ independently comprises H or optionally substituted $C_{1-30}$carbyl;

R$^1$ comprises at least one group independently selected from: an optional substituent and optionally substituted $C_{1-15}$carbyl;

R$^2$ comprises an optionally substituted $C_{1-30}$carbyl that comprises at least one alkyl group substituted by at least one group selected from: hydroxy, carboxy and sulpho;

z comprises an integer from 0 to 4; w comprises an integer from 1 to 5; and the sum of w+z comprises from 1 to 5; and x and y each independently comprises a non-zero number; and the mean of the sum of x+y comprises from about 1 to about 6;

where the optional substituents comprise at least one of: carboxy, sulpho, hydroxy, amino, mercapto, cyano, nitro and halo.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, halo, methyl, methoxy and/or combinations thereof. These optional groups include all chemically possible combinations in the same moiety of a plurality (preferably two) of the aforementioned groups (e.g. amino and sulphonyl combined represent a sulphamoyl radical). Preferred optional substituents comprise: carboxy, sulpho, hydroxy, amino, mercapto, cyano, halo, methyl (optionally substituted by one or more halo) and/or methoxy (optionally substituted by one or more halo).

The term 'carbyl' as used herein denotes any organic radical moiety which comprises one or more carbon atoms and optionally one or more other heteroatoms preferably selected from: hydrogen, phosphorus, halo, nitrogen, oxygen and/or sulphur, more preferably from hydrogen, nitrogen, oxygen and/or sulphur. The term 'hydrocarbyl' as used herein denotes any radical moiety which comprises one or more hydrogen atoms and one or more carbon atoms. Most preferably 'carbyl' moieties comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Carbyl moieties include all chemically possible combinations in the same moiety of a plurality (preferably two) of the aforementioned carbon containing and/or heteroatom moieties (e.g. alkoxy and carbonyl combined represent an alkoxycarbonyl radical):

Any radical group or moiety mentioned herein (e.g. as a substituent) refers to a monovalent radical unless otherwise stated or the context clearly indicates otherwise (e.g. an alkylene moiety is bivalent and links two other moieties). A group which comprises a chain of three or more atoms signifies a group in which the chain wholly or in part may be linear, branched and/or form a ring (including spiro and/or fused rings). The total number of certain atoms is specified for certain substituents for example $C_{1-n}$carbyl, signifies an carbyl moiety comprising from 1 to n carbon atoms. In any of the formulae drawn herein if one or more ring substituents are not indicated as attached to any particular atom on the ring [for example the substituent R$^1$ in Formula (1)] the substituent may replace any H attached to an atom in the ring and may be located at any available position on the ring which is chemically suitable.

According to a further feature of the present invention there is provided an ink effective for use in ink jet printing (IJP-effective) comprising a medium and a colorant comprising a IJP-effective compound of Formula (1) as defined herein. Preferably in the ink of the present invention the compounds of Formula (1) comprise dyes, more preferably dyes comprising a predominately cyan colour.

The term 'IJP effective' (for example with reference to the inks, compositions, ingredients, substituents and/or compounds described herein) will be understood to mean effective for use in inkjet printing by for example: providing desirable properties to the ink, being compatible with any inert carriers and/or diluents suitable for formulating such inks, being compatible with ink jet printers and/or capable of being ink-jet printed. In relation to the processes described herein effective compounds are those which will undergo the specified reactions to form the compounds of the present invention. To be particularly acceptable for use in IJP compounds of Formula (1) may be Ames negative.

In Formula (1) when M is a metal it may be selected from any IJP-effective metal or mixture thereof in the same complex. The metal may exist in any suitable oxidation state and may be neutral or charged (i.e. an ion). M may also comprise a metal bonded to one or more oxygen atoms, halo atoms or hydroxy groups, for example at least one of: AlCl, AlOH, RhCl, RhOH, InBr, InCl, InOH, GaCl, GaOH, ScCl and ScOH. Preferably M comprises a metal selected from Li, Na, K, Mg, Ca, Ba, Al, In, Ga, Zn, Si, Sn, Pb, Rh, Sc, Ti, V, Cr, Mn, Fe, Co, Ni and Cu; more preferably from Zn, Sc, Ti, V, Cr, Mn, Fe, Co, Ni and Cu; and most preferably from Ni and Cu. Especially preferred compounds of Formula (1) are those in which M comprises Cu.

Preferred compounds of Formula (1) are those in which:

z is 0, 1 or 2; and when z is other than 0, $R^1$ represents an optionally substituted group independently selected from: carboxy, carboxy$C_{1-6}$alkyl, sulpho, $C_{1-6}$alkyl, $C_{1-6}$alkoxy, halo, cyano, nitro, amino, $C_{1-6}$alkylamino, di($C_{1-6}$alkyl)amino, $C_{6-12}$arylamido (e.g. benzamido), $C_{1-7}$alkanoylamino; $C_{1-6}$alkylcarbamoyl and $C_{1-6}$alkylsulphamoyl;

L represents a $C_{1-15}$carbyl group, which may be attached to the benzene ring at the position para to the sulphonylamino group attached to the Pc nucleus;

A represents —S— or a protonable amino group comprising —$NR^3$— where $R^3$ represents H or an optionally substituted $C_{1-22}$carbyl that comprises at least one alkyl group substituted by hydroxy, carboxy and/or sulpho;

$R^2$ independently represents an optionally substituted $C_{1-22}$carbyl that comprises at least one alkyl group substituted by hydroxy, carboxy and/or sulpho;

w is 1 and;

x and y each represent from 1 to 3 and the sum of x+y is from 1 to 4.

More preferred compounds of Formula (1) are those preferred compounds in which:

M is Cu;

L represents sulphonyl$C_{1-15}$alkylene;

A represents —S—; or —$NR^3$ where $R^3$ represents H or $C_{1-6}$alkyl optionally substituted by at least one of: hydroxy, sulpho or carboxy;

$R^2$ represents $C_{1-16}$alkyl; $C_{6-18}$aryl; or $C_{1-6}$alkylene(Y$C_{1-6}$alkylene)$_n$ each optionally substituted by at least one group selected from: methyl, hydroxy, sulpho or carboxy;

where n is 0, 1 or 2; and Y is independently, —O— or —N($C_2H_4$)N—;

z is 0 or 1; and the sum of x+y is 4.

Most preferred compounds of Formula (1) are those more preferred compounds in which:

L represents sulphonyl$C_{1-4}$alkylene attached to the benzene ring via the S atom and para to the —$SO_2NH$— group;

A represents —S—; or —$NR^3$ where $R^3$ represents H or $C_{1-4}$alkyl optionally substituted by at least one of: hydroxy, sulpho and/or carboxy;

$R^2$ represents $C_{1-16}$alkyl; phenyl or $C_{1-4}$alkoxy$C_{1-4}$alkyl; each optionally substituted by at least one group selected from: methyl, hydroxy, sulpho and/or carboxy;

z is 0; and x and y are both 2; or x is 1 and y is 3.

Specific compounds of Formula (1) comprise those compounds exemplified herein in their acid form(s); all IJP-effective salts thereof, preferably their lithium, potassium, sodium and/or optionally substituted ammonium salt(s); and mixtures thereof, preferably IJP-effective mixtures.

Compounds of Formula (1) may be in the form as shown in the structures herein (i.e. free acid form) but are preferably in the form of salts. Salts of Formula (1) may be formed from one or more organic and/or inorganic bases and/or acids and compounds of Formula (1) which are acidic and/or basic (for example acid and/or base addition salts). Salts of Formula (1) comprise all IJP-effective salts that may be formed from monovalent and/or multivalent acids and/or bases. Salts of Formula (1) also comprise all enantiomeric salts formed with IJP-effective chiral acids and/or bases and/or any mixtures of enantiomers of such salts (for example racemic mixtures). The dyes may be converted into a salt using known techniques. The present invention comprises all IJP-effective salts of Formula (1) and IJP-effective mixtures thereof.

Preferred salts of Formulae (1) are alkali metal salts (especially lithium, sodium and potassium salts), and optionally substituted ammonium salts (especially salts with ammonia and volatile amines). More preferred salts are those with a cation of formula $^+NT_4$ where each T is independently H or optionally substituted alkyl, or two groups represented by T are H or optionally substituted alkyl and the remaining two groups represented by T, together with the N atom to which they are attached, form a 5 or 6 membered ring (preferably a morpholine, pyridine or piperidine ring). Most preferably each T is independently H or $C_{1-4}$alkyl, especially H, $CH_3$ or $CH_3CH_2$, more especially H. Examples of cations which are IJP-effective comprise: +$NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N+(CH_2CH_3)_2$, $CH_3CH_2CH_2N^+H_3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

Certain compounds of Formula (1) may exist as one or more stereoisomers, for example, enantiomers, diastereoisomers, geometric isomers, tautomers, conformers and/or combinations thereof within the same moiety. The present invention comprises all IJP-effective stereoisomers of compounds of Formula (1) and IJP-effective mixtures thereof.

Certain compounds of Formula (1) may exist as one or more zwitterions, for example, moieties which comprise two or more centres of ionic charge. The present invention comprises all IJP-effective zwitterions of Formula (1) and IJP-effective mixtures thereof.

Certain compounds of Formula (1) may exist as one or more polymorphs, for example, phases, crystalline forms, amorphous forms, solid solutions, interstitial compounds and/or any mixtures thereof. The present invention comprises all IJP-effective polymorphs of Formula (1) and IJP-effective mixtures thereof.

Certain compounds of Formula (1) may exist in the form of one or more other complexes in addition to the metal complexes shown herein, for example, chelates, solvates, other organometallic complexes, and/or complexes with other IJP-effective ligands. Such complexes may be formed between an suitable substrate in which the compound of Formula (1) and/or the substrate may act as a ligand. The substrate may comprise one or more solvents to form solvates. The complexes may be non-stoichiometric, for example if the complex is a hydrate it may comprise a hemihydrate, monohydrate and/or dihydrate. The present invention comprises all IJP-effective complexes of Formula (1) and IJP-effective mixtures thereof.

Certain compounds of Formula (1) may exist as one or more isotopic forms in which one or more atoms in Formula (1) comprise one or more isotopes. The natural ratios of various isotopes may be altered by suitable means, for example certain $^{12}C$ atoms in certain compounds of Formula (1) may be substantially replaced by the less common $^{14}C$ and/or $^{13}C$ isotopes. Optionally certain isotopic forms of Formula (1) may be radio-active. Certain of the isotopic forms of Formula (1) may be used as means for selective imaging in imaging devices (for example devices using X-rays, positron emission tomography and/or nuclear magnetic resonance); and/or as tools to investigate the mode of action of compounds of Formula (1) in IJP. The present invention comprises all IJP-effective, isotopic forms of Formula (1) and IJP-effective mixtures thereof.

The present invention relates to all compounds of Formula (1) even those which may not be directly effective for use in IJP because they exhibit undesirable properties. Such compounds may nevertheless have utility in the field of the present invention for example as intermediates in the preparation and/or purification of IJP-effective compounds of Formula (1) and/or as research tools and/or diagnostic aids in relation to IJP.

Compounds of Formula (1) may be prepared the methods described below and by other suitable methods analogous to those described in the art for similar phthalocyanine compounds.

A preferred method for preparing compounds of Formula (1) in which L is $SO_2C_2H_4$ comprises reacting compounds of Formula (3):

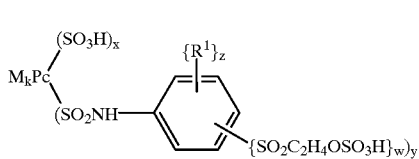

Formula (3)

with compounds of formula $R^2AH$ where Pc, $M_k$, $R^1$, w, x, y, z; and $R^2$ and A are as defined herein. Compounds of Formula (3) in which M is Cu, k is 0, z is 0 and w is 1 are available commercially.

The reactions leading to the formation of the present compounds may be performed under conditions that have been described in the art and compounds of Formula (1) may be isolated by known methods such as spray drying or precipitation followed by filtration.

Preferably the ink of the present invention comprises:
(a) from 0.01 to 30 parts of an IJP-effective compound of Formula (1); and
(b) from 70 to 99.99 parts of a liquid medium or a low melting point solid medium;
wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:

$C_{1-6}$-alkanols, preferably methanol, ethanol, n-propanol, isopropanol, n-butanol, sec-butanol, tert-butanol, n-pentanol, cyclopentanol and/or cyclohexanol;

linear amides, preferably dimethylformamide and/or dimethylacetamide;

ketones and/or ketone-alcohols, preferably acetone, methyl ether ketone, cyclohexanone and/or diacetone alcohol;

water-miscible ethers, preferably tetrahydrofuran and/or dioxane;

diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol);

triols, preferably glycerol and/or 1,2,6-hexanetriol;

$C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy]-ethanol, 2-[2-(2-ethoxyethoxy)-ethoxy]-ethanol and/or ethyleneglycol monoallyl ether};

cyclic amides, preferably 2-pyrrolidone, N-methyl-2-pyrrolidone, N-ethyl-2-pyrrolidone, caprolactam and/or 1,3-dimethylimidazolidone;

cyclic esters, preferably caprolactone;

sulphoxides, preferably dimethyl sulphoxide and/or sulpholane; and/or all IJP-effective mixtures thereof.

More preferred water-soluble organic solvents are selected from:

cyclic amides (e.g. 2-pyrrolidone, N-methyl-pyrrolidone and N-ethyl-pyrrolidone);

diols, (e.g. 1,5-pentane diol, ethyleneglycol, thiodiglycol, diethyleneglycol and triethyleneglycol);

$C_{1-4}$alkyl ethers of diols (e.g. 2-methoxy-2-ethoxy-2-ethoxyethanol); and all IJP-effective mixtures thereof.

A preferred liquid medium comprises:
(a) from 75 to 95 parts water; and
(b) from 25 to 5 parts in total of one or more solvents selected from: diethylene glycol, 2-pyrrolidone, thiodiglycol, N-methylpyrrolidone, cyclohexanol, caprolactone, caprolactam and pentane-1,5-diol;
where the parts are by weight and the sum of the parts (a)+(b)=100.

Another preferred liquid medium comprises:
(a) from 60 to 80 parts water;
(b) from 2 to 20 parts diethylene glycol; and
(c) from 0.5 to 20 parts in total of one or more solvents selected from:
2-pyrrolidone, N-methylpyrrolidone, cyclohexanol, caprolactone, caprolactam, pentane-1,5-diol and thiodiglycol;
where the parts are by weight and the sum of the parts (a)+(b)+(c)=100.

Examples of further IJP-effective media for inks of the present invention comprise a mixture of water and one or more organic solvents are described in U.S. Pat. No. 4,963,189, U.S. Pat. No. 4,703,113, U.S. Pat. No. 4,626,284 and EP 0425150-A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The dye of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying to the substrate by means of an ink jet printer, an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper. Preferred papers are plain or treated papers which may have an acid, alkaline or neutral character.

A further aspect of the present invention provides a paper, an overhead projector slide or a textile material printed with an ink and/or a colorant as defined herein and/or by means of a process as defined herein.

When the substrate is a textile material the ink according to the invention is preferably applied thereto by:
i) applying the ink to the textile material using an ink jet printer; and
ii) heating the printed textile material at a suitable temperature, preferably from 50° C. to 250° C., to fix the ink on the material.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

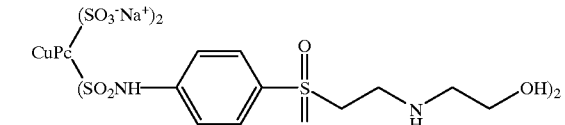

a) Preparation of

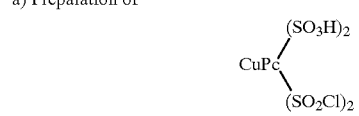

Copper phthalocyanine (115 g) was added in portions to stirred chlorosulphonic acid (310 ml) over 30 minutes keeping the temperature below 50° C. The mixture was stirred for 30 minutes at 50° C. before being heated gradually to 135–140° C. over one hour. The temperature of the mixture was maintained at 140° C. and it was stirred for 3 hours and then cooled to room temperature.

The mixture was heated to 45° C. and phosphorus trichloride (52.3 g) was added dropwise over 1 hour 15 minutes, whilst the temperature was kept at 45–50° C. The temperature of the mixture was raised to 90° C. and was maintained at this for 3 hours and then cooled to room temperature.

The resulting solution was poured onto a stirred mixture of ice (1 kg), water (200 ml), concentrated hydrochloric acid (44 ml) and sodium chloride (40 g) maintained at a temperature of 0° C. The precipitated product was collected by filtration at reduced pressure and washed with ice-cold hydrochloric acid solution (0.5 M, 2 l) to obtain a paste which was dried under reduced pressure to obtain CuPc $(SO_3H)_2(SO_2Cl)_2$ which was used directly in the next step.

b) Preparation of

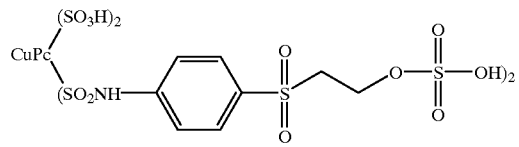

The sulponyl chloride from step a) was added to a mixture of p-aminobenzenesulphatoethylsulphone (112.4 g) in water (500 ml) and ice (500 g). The mixture was stirred for 10–15 minutes and then the pH of the mixture was raised to between 6.5 to 7.0 with caustic liquor. The mixture was stirred at room temperature for 18 hours whilst maintaining the pH at 7.0 by adding 2N NaOH. Sodium chloride (10% w/v) was added to the mixture which was stirred for 20 minutes and the pH of the mixture was adjusted to 2.5 with concentrated hydrochloric acid. The mixture was stirred for a further minutes and the resultant precipitate was collected by filtration at reduced pressure and washed with ice cold brine (10%) and dried under reduced pressure to obtain 954.8 g of product.

c) Preparation of title sodium salt.

The compound from step b) above (318 g) was stirred in distilled water (700 g) and the pH of the solution was adjusted to 6.5–7.0 with 2N NaOH. Ethanolamine (16.07 g) was added to this solution and the mixture was heated to 80–85° C. and maintained at this temperature for 18 hours. The mixture was cooled to room temperature and sodium chloride (20% w/v) was added and the pH of the mixture was adjusted to 7.0 with concentrated hydrochloric acid. The mixture was stirred and cooled to 10° C. and stirred at this temperature for a further 30 minutes.

The resultant precipitate was collected by filtration at reduced pressure and washed with brine (20%) to obtain a paste. This was then dissolved in water (about 2 liters) and desalinated by reverse osmosis. The resultant solution was filtered and water was evaporated from the filtrate to give the title sodium salt (56.7 g).

EXAMPLE 2

Preparation of

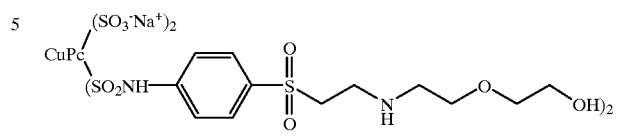

This sodium salt (76.4 g) was prepared as described in Example 1 substituting 2-aminoethoxyethanol (27.66 g) for the ethanolamine used in step 1c.

EXAMPLE 3

Preparation of

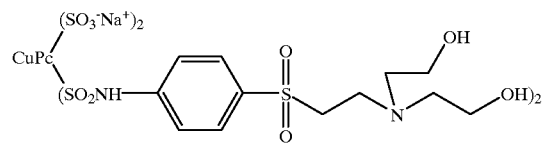

This sodium salt (61.7 g) was prepared as described in Example 1 substituting diethanolamine (27.66 g) for the ethanolamine used in step 1c.

EXAMPLE 4

Preparation of

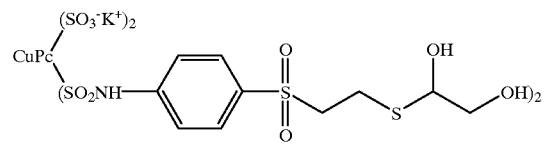

This potassium salt (70.43 g) was prepared as described in Example 1 substituting mercapto-1,2-propanediol (25.10 g) for the ethanolamine used in step 1c and then, after the desalination in step 1c, converting the sodium salt to the potassium salt as described below.

EXAMPLE 5

Preparation of

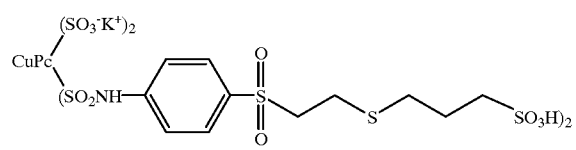

This potassium salt (79.15 g) was prepared as described in Example 1 substituting 3-mercaptopropanesulphonic acid (37.39 g) for the ethanolamine used in step 1c and then, after the desalination in step 1c, converting the sodium salt to the potassium salt as described below.

EXAMPLE 6

Preparation of

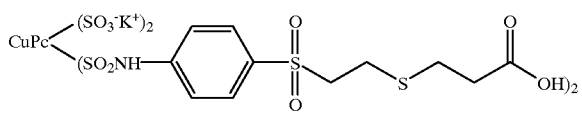

This potassium salt (77.37 g) was prepared as described in Example 1 substituting 3-mercaptopropanionic acid (28.03 g) for the ethanolamine used in step 1c and then, after the desalination in step 1c, converting the sodium salt to the potassium salt as described below.

EXAMPLE 7

Preparation of

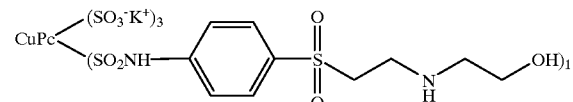

a) Preparation of

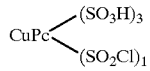

Copper phthalocyanine (115 g) was added in portions to stirred chlorosulphonic acid (317 ml) and concentrated sulphuric acid (147 ml). The mixture was heated to 140° C. for 3 hours and then cooled to room temperature. This mixture was then poured onto a stirred mixture of ice (1 kg), water (200 ml), concentrated hydrochloric acid (44 ml) and sodium chloride (40 g). The precipitated product was collected by filtration at reduced pressure to obtain a paste of CuPc(SO$_3$H)$_3$(SO$_2$Cl)$_1$ (817.8 g) which was used directly in the next step.

b) Preparation of

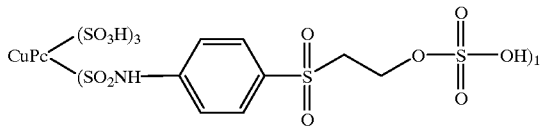

The sulphonyl chloride from step a) was added to a mixture of p-aminobenzenesulphatoethylsulphone (133 g) in water (700 ml) at pH 5.2 (adjusted by adding 15% aqueous NaOH). The mixture was stirred at pH 5.2 and room temperature for 3 hours. Sodium chloride (20% w/v) was added to the mixture which was stirred for 15 minutes and the pH of the mixture was adjusted to 1.0 with concentrated hydrochloric acid. The resultant precipitate was collected by filtration at reduced pressure and washed with ice cold brine (10%) and dried under reduced pressure to obtain 688 g of product.

c) Preparation of title potassium salt.

The compound from step b) above (219 g) was stirred in distilled water (1 l) and ethanolamine (19.6 g) was added to this solution and the mixture was heated to 70–75° C. and maintained at this temperature for 3 hours. The mixture was cooled to room temperature and sodium chloride (20% w/v) was added. The pH of the mixture was then adjusted to 1.5 with concentrated hydrochloric acid and the mixture was stirred for 15 minutes.

The resultant precipitate was collected by filtration at reduced pressure and washed with brine (20%) to obtain a paste. This was then dissolved in water (about 2 liters) and desalinated by reverse osmosis. The resultant solution of the sodium salt was converted to a solution of the potassium salt as described below and water was evaporated from the solution to give the title potassium salt (53.0 g).

EXAMPLE 8

Preparation of

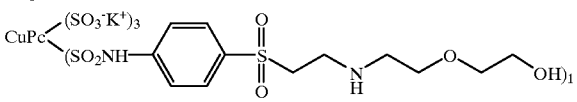

This potassium salt (60.6 g) was prepared as described in Example 7 substituting aminoethoxyethanol (33.7 g) for the ethanolamine used in step 7c.

EXAMPLE 9

Preparation of

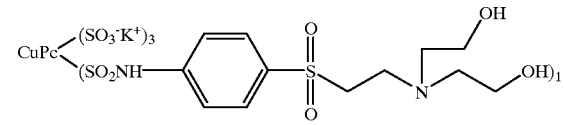

This potassium salt (61 g) was prepared as described in Example 7 substituting diethanolamine (34.3 g) for the ethanolamine used in step 7c.

EXAMPLE 10

Preparation of

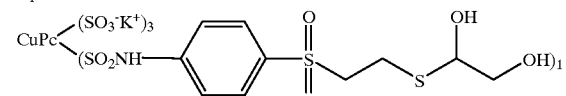

This potassium salt (54.0 g) was prepared as described in Example 7 substituting 3-mercapto-1,2-propanediol (30.11 g) for the ethanolamine used in step 7c.

EXAMPLE 11

Preparation of

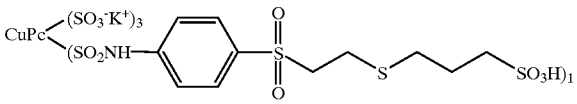

This potassium salt (65.0 g) was prepared as described in Example 7 substituting 3-mercaptopropanesulphonic acid (44.80 g) for the ethanolamine used in step 7c.

EXAMPLE 12

Preparation of

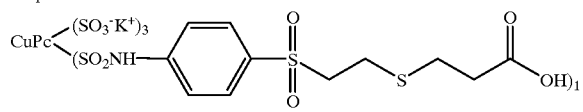

This potassium salt (55.5 g) was prepared as described in Example 7 substituting 3-mercaptopropionic acid (44.80 g) for the ethanolamine used in step 7c.

EXAMPLES 13 TO 30

Additional examples of certain dyes represented generally by Formula (4) were prepared.

Formula (4)

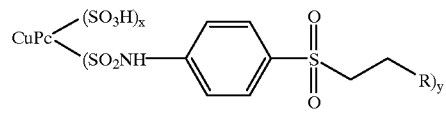

For each of the following Examples the specific R, x and y in Formula (4) is as set out in the table below. The following Examples with ratio x to y=3 to 1 were made as described in Example 7 above, whereas those Examples with ratio x to y of 2 to 2 were prepared as described in Example 1 above. The acids of Formula (4) were converted into their sodium or potassium salts also as described in Examples 1 or 7 respectively.

Table of Examples 13 to 30

| Example | R | x | y |
|---|---|---|---|
| 13 | ←NHC$_{16}$H$_{33}$ | 3 | 1 |
| 14 | ←NHC$_{10}$H$_{21}$ | 3 | 1 |
| 15 | ←NHC$_{12}$H$_{25}$ | 3 | 1 |
| 16 | ←NHC$_{8}$H$_{17}$ | 3 | 1 |
| 17 | ←NHC$_{6}$H$_{13}$ | 3 | 1 |
| 18 | ←NHC$_{14}$H$_{19}$ | 3 | 1 |
| 19 | ←NH-CH$_2$-C(CH$_3$)$_2$-CH$_2$-C(CH$_3$)$_3$ | 3 | 1 |
| 20 | ←NH-CH$_2$-C(CH$_3$)$_2$-CH$_2$-C(CH$_3$)$_2$-CH$_3$ | 3 | 1 |
| 21 | ←SC$_{10}$H$_{21}$ | 3 | 1 |
| 22 | ←SC$_{12}$H$_{25}$ | 3 | 1 |
| 23 | ←SC$_{12}$H$_{25}$ | 2 | 2 |
| 24 | ←SC$_{10}$H$_{21}$ | 2 | 2 |
| 25 | ←SC$_{8}$H$_{17}$ | 3 | 1 |
| 26 | ←SC$_{8}$H$_{17}$ | 2 | 2 |
| 27 | ←S-(2,4,6-trimethylphenyl) | 2 | 2 |
| 28 | ←SC$_{16}$H$_{33}$ | 2 | 2 |
| 29 | ←S-C$_6$H$_4$-OH | 3 | 1 |
| 30 | ←S-C$_6$H$_4$-OH | 2 | 2 | in the above Table the arrow indicates the point of attachment of the group R in the compound of Formula (4).

Salts

The exemplified sodium salts (examples 1 to 3) prepared as described above, were converted to their purified potassium salts as follows. Each example was dissolved in distilled water. The solution was filtered and the volume of the filtrate adjusted to 4 liters. The solution was desalinated by reverse osmosis. The dissolved sodium salt was converted into the potassium salt by passing the solution through an ion-exchange column comprising Dowex HGRW resin saturated with potassium hydroxide solution (5% w/v). The solution of the potassium salt thus obtained was then filtered and water was evaporated form the filtrate to yield a purified potassium salt suitable for use directly in an ink as described below.

Inks

The effectiveness in ink jet printing of compounds of Formula (1) was demonstrated as follows. Inks separately comprising each exemplified dye were prepared by dissolving 2 parts of the potassium salt, prepared as described above, in 98 parts of a mixture of water and 2-pyrrolidone (in a respective ratio of 90:10 by volume). The inks were printed onto plain paper using a thermal ink-jet printer to give a bright cyan prints which had good optical density, water fastness and light fastness.

Further inks comprising the exemplified dyes may be may be prepared as described in the following tables in which the number in the first column (headed Ex. no.) denotes the example number of dye to be used in the ink. The dye may be in its free acid form and/or in the form of any IJP-effective salt (e.g. potassium salt). Numbers quoted in the second column onwards refer to the number of parts of the relevant ingredient and all parts are by weight. The inks may be applied to paper by thermal and/or piezo ink jet printing.

The following abbreviations are used in the tables:

PG = propylene glycol; DEG = diethylene glycol; NMP = N-methyl pyrollidone;
DMK = dimethylketone; NaST = Na stearate; IPA = isopropanol;
MEOH = methanol; 2P = 2-pyrrolidone; MIBK = methylisobutyl ketone;
CET = cetyl ammonium bromide; TBT = tertiary butanol; TDG = thiodiglycol;
BDL = butane-2,3-diol; PHO = Na₂HPO₄; P12 = propane-1,2-diol.
CHL = cyclohexanol; and PDL = pentan-1,5-diol.

TABLE I

| Ex. no. | Dye | Water | PG | DEG | NMP | DMK | MEOH | 2P | MIBK |
|---|---|---|---|---|---|---|---|---|---|
| 1 | 2.0 | 80 | 5 | | 6 | 4 | | 5 | |
| 2 | 10.0 | 85 | 3 | | 3 | 3 | 5 | 1 | |
| 3 | 2.1 | 91 | | 8 | | | | | 1 |
| 4 | 2.4 | 75 | 3 | 4 | | 5 | 6 | | 5 |
| 5 | 5.1 | 96 | | | | | 4 | | |
| 6 | 1.8 | 80 | | 5 | | | | 15 | |
| 7 | 2.6 | 84 | | | 11 | | | 5 | |
| 8 | 3.3 | 80 | 2 | | | 10 | 2 | | 6 |
| 9 | 5.4 | 69 | 2 | 20 | 2 | 1 | | 3 | 3 |
| 10 | 7.0 | 70 | | | 15 | | 3 | | 10 |

TABLE II

| Ex. No. | Dye | Water | PG | DEG | NMP | NaOH | Na ST | IPA | 2P | MIBK |
|---|---|---|---|---|---|---|---|---|---|---|
| 11 | 2.0 | 70 | | 7 | | 6 | | 3 | | 2 |
| 12 | 4.0 | 65 | 4 | | 6 | | 0.7 | | 5 | |
| 13 | 1.0 | 50 | | 4 | | | | 5 | | 1 |
| 14 | 3.1 | 86 | 5 | | | 2 | 0.2 | 4 | | 5 |
| 15 | 1.1 | 81 | | 2 | 9 | 0.5 | 0.5 | | 9 | |

TABLE III

| Ex. No. | Dye | Water | PG | DEG | NMP | DMK | IPA | MEOH | 2P | MIBK |
|---|---|---|---|---|---|---|---|---|---|---|
| 16 | 3.1 | 86 | 5 | | | | 4 | | | 5 |
| 17 | 1.1 | 81 | | | 9 | | | | 9 | |
| 18 | 2.5 | 60 | 4 | 15 | 3 | 3 | 6 | 10 | 5 | 4 |
| 19 | 3.2 | 65 | | 5 | 4 | 6 | 5 | 4 | 6 | 5 |
| 20 | 10.0 | 80 | 2 | 6 | 2 | 5 | 1 | | 4 | |

TABLE IV

| Ex. no. | Dye | Water | PG | DEG | NMP | DMK | NaOH | Na ST | IPA |
|---|---|---|---|---|---|---|---|---|---|
| 21 | 3.0 | 90 | | 5 | 5 | | 0.2 | | |
| 22 | 5 | 65 | 5 | 20 | | | | | 10 |
| 23 | 4.1 | 80 | | 5 | 2 | 10 | | 0.3 | |
| 24 | 10.8 | 90 | 5 | | | | | | 5 |
| 25 | 12.0 | 90 | | | | 7 | 0.3 | | 3 |

TABLE V

| Ex. no. | Dye | Water | PG | DEG | NMP | CET | PHO | 2P | P12 |
|---|---|---|---|---|---|---|---|---|---|
| 26 | 3.0 | 80 | 15 | | | 0.2 | | 5 | |
| 27 | 9.0 | 90 | | 5 | | | 1.2 | 5 | |
| 28 | 2.5 | 90 | | 6 | 4 | | 0.12 | | |

TABLE V-continued

| Ex. no. | Dye | Water | PG | DEG | NMP | CET | PHO | 2P | P12 |
|---|---|---|---|---|---|---|---|---|---|
| 29 | 3.1 | 82 | 4 | 8 | | 0.3 | | | 6 |
| 30 | 10.0 | 91 | | | 6 | | | 3 | |
| 1 | 5.0 | 78 | 5 | 11 | | | | 6 | |
| 2 | 6.0 | 63 | 3 | | 4 | | 2.0 | | |
| 3 | 3.0 | 72 | | 15 | | 0.8 | | | 3 |
| 4 | 5.4 | 86 | 5 | | 7 | | 3.0 | 7 | |
| 5 | 2.0 | 90 | | 10 | | | | | 10 |

TABLE VI

| Ex. no. | Dye | Water | PG | DEG | NMP | CET | TBT | TDG |
|---|---|---|---|---|---|---|---|---|
| 6 | 1.5 | 85 | 5 | 5 | | 0.15 | 5.0 | 0.2 |
| 7 | 9.0 | 90 | | 5 | 5 | | | 0.3 |
| 8 | 2.0 | 90 | | 10 | | | | |
| 9 | 2.0 | 88 | | | | | | 10 |
| 10 | 5.5 | 70 | 4 | | 4 | 0.4 | 3 | |

TABLE VII

| Ex. no. | Dye | Water | PG | DEG | NMP | TBT | TDG | BDL | PHO | 2P |
|---|---|---|---|---|---|---|---|---|---|---|
| 11 | 0.9 | 85 | | 10 | | | | 5 | 0.2 | |
| 12 | 4.0 | 70 | | 10 | 4 | | | 1 | | 4 |
| 13 | 2.2 | 75 | 4 | 10 | 3 | | | 2 | | 6 |

TABLE VII-continued

| Ex. no. | Dye | Water | PG | DEG | NMP | TBT | TDG | BDL | PHO | 2P |
|---|---|---|---|---|---|---|---|---|---|---|
| 14 | 9.0 | 76 | | 9 | 7 | 3.0 | | | 0.95 | 5 |
| 15 | 2.1 | 70 | 5 | 5 | 5 | 0.2 | 0.1 | 5 | 0.1 | 5 |

TABLE VIII

| Ex. no. | Dye | Water | PG | DEG | NMP | TBT | TDG | 2P |
|---|---|---|---|---|---|---|---|---|
| 16 | 3.0 | 55 | | | 5 | 2.0 | | 3 |
| 17 | 6.0 | 65 | | 4 | | 0.1 | 5 | |
| 18 | 5.0 | 78 | | | 5 | | 12 | 5 |
| 19 | 8.0 | 70 | 2 | | 8 | | 15 | 5 |
| 20 | 10.0 | 80 | | | | | 8 | 12 |

TABLE IX

| Ex. no. | Dye | Water | PG | DEG | NMP | BDL | PHO | 2P | P12 |
|---|---|---|---|---|---|---|---|---|---|
| 21 | 10.0 | 75 | 3 | | 5 | 3 | | 3 | 1 |
| 22 | 3.5 | 80 | | 6 | | | | | 5 |
| 23 | 2.0 | 90 | 7 | | | 7 | 0.5 | | |
| 24 | 6.0 | 65 | | | 5 | | | 2 | |
| 25 | 4.0 | 70 | | 10 | 4 | 1 | | 4 | 11 |

TABLE X

| Ex. No. | Dye | Water | PG | DEG | NMP | CET | TBT | TDG | BDL | PHO | 2P |
|---|---|---|---|---|---|---|---|---|---|---|---|
| 26 | 1.5 | 80 | 1 | 2 | 3 | 0.5 | 0.4 | | 7 | 2 | 10 |
| 27 | 3.0 | 60 | | 4 | | 2.0 | | 0.5 | | | |
| 28 | 4.5 | 90 | | 3 | 6 | | 7.0 | | 1 | 3 | 2 |
| 29 | 3.0 | 95 | | 7 | | 4 | | 3 | | 0.5 | |
| 30 | 2.1 | 70 | 5 | 5 | 5 | 0.1 | 0.2 | 0.1 | 5 | 0.1 | 5 |

TABLE XI

| Ex. no. | Dye | Water | PG | DEG | NMP | CHL | PHO | 2P | PDL |
|---|---|---|---|---|---|---|---|---|---|
| 1 | 7.0 | 75 | 3 | | 5 | 3 | | 3 | 1 |
| 2 | 3.5 | 60 | | | 2 | | | | 5 |
| 3 | 2.0 | 90 | 7 | | | 7 | 1.5 | | 2 |
| 4 | 6.0 | 65 | | | 5 | | | 2 | |
| 5 | 4.0 | 70 | | 5 | 4 | 1 | | 4 | 12 |

What is claimed is:

1. A compound of Formula (1):

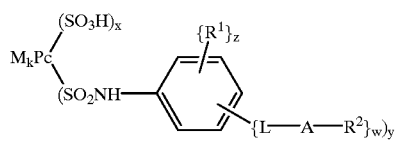

Formula (1)

or a salt, stereoisomer, zwitterion, polymorph, complex or isotopic form thereof;

where:

M represents H, metal, halometal, oxymetal and/or hydroxymetal;

k is the inverse of half of the valency of M;

Pc represents a phthalocyanine nucleus of Formula (2):

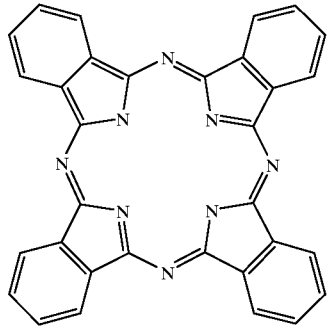

Formula (2)

L represents sulphonyl$C_{1-15}$alkylene;

A represents —O—, —S— or —NR$^3$—, where R$^3$ represents H or an optionally substituted $C_{1-22}$carbyl that comprises at least one alkyl group substituted by hydroxy, carboxy and/or sulpho;

R$^1$ is selected from the group consisting of an optional substituent and an optionally substituted $C_{1-15}$carbyl;

R$^2$ comprises optionally substituted $C_{1-30}$carbyl that comprises at least one alkyl group substituted by at least one of hydroxy, carboxy and sulpho;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo.

2. A compound according to claim 1, in which: z is 0, 1 or 2; and when z is other than 0, R$^1$ represents an optionally substituted group independently selected from the group consisting of: carboxy, carboxy$C_{1-6}$alkylamino, sulpho, $C_{1-6}$alkyl, $C_{1-6}$alkoxy, halo, cyano, nitro, amino, $C_{1-6}$alkylamino, di($C_{1-6}$alkyl)amino, $C_{6-12}$arylamido, $C_{1-7}$alkanoylamino; $C_{1-6}$alkylcarbamoyl and $C_{1-6}$alkylsulphamoyl;

L represents sulphonyl$C_{1-15}$alkylene;

A represents —S— or a protonable amino group comprising —NR$^3$— where R$^3$ represents H or an optionally substituted $C_{1-22}$carbyl that comprises at least one alkyl group substituted by hydroxy, carboxy and/or sulpho;

R$^2$ independently represents an optionally substituted $C_{1-22}$carbyl that comprises at least one alkyl group substituted by hydroxy, carboxy and/or sulpho;

w is 1 and;

x and y each represent from 1 to 3 and the sum of x+y is from 1 to 4.

3. A compound according to claim 1 or 2, in which:

M is Cu;

L represents sulphonyl$C_{1-15}$alkylene;

A represents —S—; or —$NR^3$ where $R^3$ represents H or $C_{1-6}$alkyl optionally substituted by at least one of: hydroxy, sulpho or carboxy;

$R^2$ represents $C_{1-16}$alkyl; $C_{6-18}$aryl; or $C_{1-6}$alkylene($YC_{1-6}$alkylene) each optionally substituted by at least one group selected from the group consisting of: methyl, hydroxy, sulpho and carboxy;

where n is 0, 1 or 2; and Y is independently, —O— or —N($C_2H_4$)N—;

z is 0 or 1; and the sum of x+y is 4.

4. A compound according to claim 1 or 2, in which:

L represents sulphonyl$C_{1-4}$alkylene attached to the benzene ring via the S atom and para to the —$SO_2NH$— group;

A represents —S—; or —$NR^3$ where $R^3$ represents H or $C_{1-4}$alkyl optionally substituted by at least one of; hydroxy, sulpho and/or carboxy;

$R^2$ represents $C_{1-16}$alkyl; phenyl; or $C_{1-4}$alkoxy$C_{1-4}$alkyl; each substituted by at least one group selected from the group consisting of: methyl, hydroxy, sulpho and/or carboxy;

z is 0; and x and y are both 2; or x is 1 and y is 3.

5. An ink effective for use in ink jet printing, comprising a liquid medium and a colorant comprising at least one compound of Formula (1):

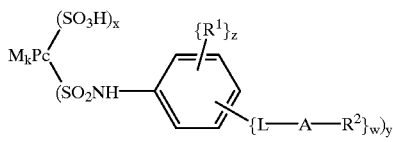

Formula (1)

which comprises any form of the compound where:

M represents H, metal, halometal, oxymetal and/or hydroxymetal;

k is the inverse of half of the valency of M;

Pc represents a phthalocyanine nucleus of Formula (2):

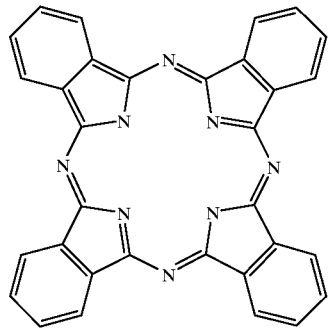

Formula (2)

L represents sulphonyl$C_{1-15}$alkylene;

A represents —O—, —S— or —$NR^3$—, where $R^3$ independently comprises H or optionally substituted $C_{1-30}$ carbyl;

$R^1$ comprises at least one group independently selected from the group consisting of: an optional substituent and optionally substituted $C_{1-15}$ carbyl;

$R^2$ comprises optionally substituted $C_{1-30}$ carbyl that comprises at least one alkyl group substituted by at least one of: hydroxy, carboxy and sulpho;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo.

6. A process for printing an image on a substrate comprising applying to the substrate by means of an ink-jet printer an ink according to claim 5.

7. A substrate printed with an ink as claimed in claim 5, the substrate selected from the group consisting of paper, an overhead projector slide and a textile material.

8. A process for colouring a txtile material with an ink according to claim 5, the process comprising the steps of:
  i) applying the ink to the textile material by ink-jet printing; and
  ii) heating the textile material at 50° C. to 250° C. to fix the ink on the material.

9. A textile material coloured with an ink according to claim 5.

10. A compound according to claim 1 in the form of a salt.

11. A compound according to claim 10 wherein the salt comprises an alkali metal salt.

12. A compound according to claim 10 wherein the salt comprises a salt with ammonia or a volatile amine.

13. An ink according to claim 1 wherein the liquid medium comprises water or a mixture of water and an organic solvent.

14. An ink according to claim 5 wherein the liquid medium comprises water and a water-miscible organic solvent.

15. An ink according to claim 5 wherein the liquid medium comprises an organic solvent free from water.

* * * * *